(12) United States Patent
Goss et al.

(10) Patent No.: US 11,703,487 B2
(45) Date of Patent: Jul. 18, 2023

(54) GAS CHROMATOGRAPHY GUARD COLUMN ASSEMBLY AND GAS CHROMATOGRAPHY SYSTEM WITH GUARD COLUMN

(71) Applicant: RESTEK CORPORATION, Bellefonte, PA (US)

(72) Inventors: Michael A. Goss, Bellefonte, PA (US); Thomas E. Kane, Bellefonte, PA (US)

(73) Assignee: RESTEK CORPORATION, Bellefonte, PA (US)

( * ) Notice: Subject to any disclaimer, the term of this patent is extended or adjusted under 35 U.S.C. 154(b) by 238 days.

(21) Appl. No.: 16/937,733

(22) Filed: Jul. 24, 2020

(65) Prior Publication Data

US 2021/0025857 A1 Jan. 28, 2021

Related U.S. Application Data

(60) Provisional application No. 62/878,885, filed on Jul. 26, 2019.

(51) Int. Cl.
*G01N 30/62* (2006.01)
*G01N 30/60* (2006.01)
(Continued)

(52) U.S. Cl.
CPC ......... *G01N 30/62* (2013.01); *G01N 30/6039* (2013.01); *G01N 30/6091* (2013.01);
(Continued)

(58) Field of Classification Search
CPC ............. G01N 30/62; G01N 2030/025; G01N 2030/6013; G01N 30/461; G01N 30/6091;
(Continued)

(56) References Cited

U.S. PATENT DOCUMENTS 3,164,005 A 1/1965 Burnell et al.
5,807,426 A 7/1998 Ohtsuki et al.
(Continued)

FOREIGN PATENT DOCUMENTS

| EP | 0894267 A1 | 2/1999 |
| EP | 0985928 A1 | 3/2000 |
| WO | 2017077281 A1 | 5/2017 |

OTHER PUBLICATIONS

Abhinav Bhushan, Dawit Yemane, Dan Trudell, Edward B. Overton, Jost Goettert; "Fabrication of micro-gas chromatograph columns for fast chromatography", Published online Jun. 20, 2006 by Microsyst Technol, vol. 13, pp. 361-368 (Year: 2006).*

Primary Examiner — Alexander A Mercado
Assistant Examiner — John M Royston
(74) Attorney, Agent, or Firm — McNees Wallace & Nurick LLC

(57) ABSTRACT

A gas chromatography guard column assembly is disclosed including a guard column having an inlet and an outlet. The guard column is disposed in a coil having a column coil aspect ratio of less than 15. A gas chromatography system is disclosed including an oven cavity, a heater assembly, an inlet, a guard column, an analytical column, and a detector. The guard column is in fluid communication with the inlet and is disposed in a guard column coil. The analytical column is in fluid communication with the guard column and is disposed in an analytical column coil. The detector is in fluid communication with the analytical column. The analytical column coil has an analytical column coil central axis aligned with a central axis of the heater assembly, and the guard column coil has a guard column coil central axis remote from the central axis of the heater assembly.

19 Claims, 8 Drawing Sheets

(51) Int. Cl.
  *G01N 30/02* (2006.01)
  *G01N 30/08* (2006.01)
  *G01N 30/30* (2006.01)

(52) U.S. Cl.
  CPC . *G01N 2030/025* (2013.01); *G01N 2030/085* (2013.01); *G01N 2030/3084* (2013.01); *G01N 2030/6013* (2013.01)

(58) Field of Classification Search
  CPC ......... G01N 30/6039; G01N 2030/085; G01N 2030/3084
  See application file for complete search history.

(56) References Cited

U.S. PATENT DOCUMENTS

| | | | |
|---|---|---|---|
| 6,530,260 B1 * | 3/2003 | Mustacich | G01N 30/30 422/89 |
| 8,591,630 B2 | 11/2013 | Amirav et al. | |
| 9,244,044 B2 | 1/2016 | McCauley | |
| 9,638,675 B2 | 5/2017 | Botelho | |
| 10,067,101 B2 | 9/2018 | Traudt et al. | |
| 2006/0186046 A1 * | 8/2006 | Liu | G01N 30/62 204/518 |
| 2014/0290491 A1 * | 10/2014 | Kanai | G01N 30/6052 96/101 |
| 2015/0260694 A1 * | 9/2015 | Matsuoka | G01N 30/30 73/23.41 |
| 2018/0059089 A1 * | 3/2018 | Hinton | C10M 171/007 |
| 2018/0348173 A1 | 12/2018 | Pierce | |

\* cited by examiner

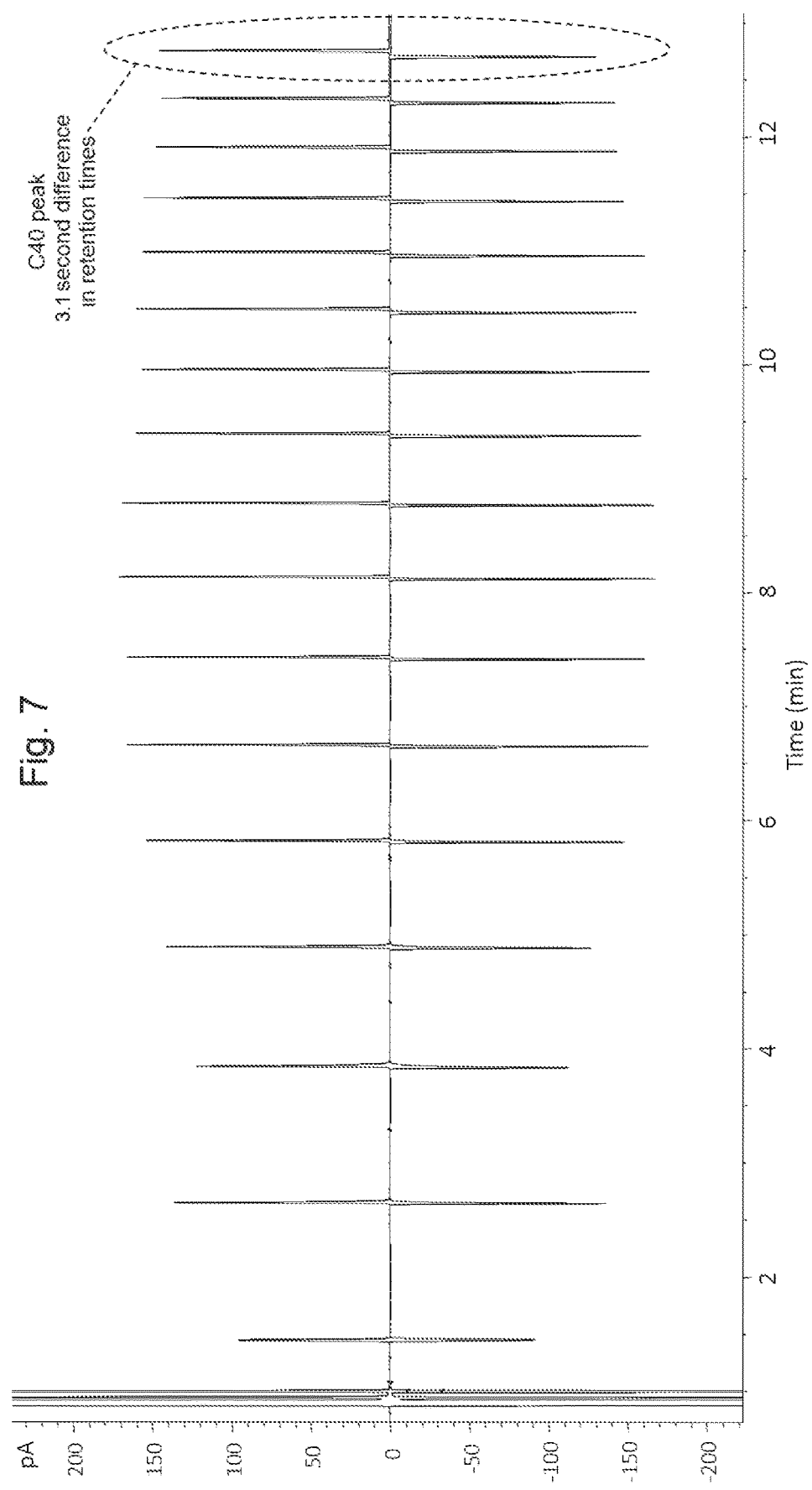

GAS CHROMATOGRAPHY GUARD COLUMN ASSEMBLY AND GAS CHROMATOGRAPHY SYSTEM WITH GUARD COLUMN

RELATED APPLICATIONS

This application claims the benefit of and priority to U.S. Prov. App. No. 62/878,885, filed Jul. 26, 2019, entitled "Narrow Coil Diameter, High Aspect Ratio Guard Column, Positioned Off-Center Axis in the GC Oven," which is hereby incorporated by reference in its entirety.

FIELD OF THE INVENTION

This application is directed to gas chromatography guard column assemblies and gas chromatography systems with guard columns.

BACKGROUND OF THE INVENTION

Gas chromatography (GC) is a well-known analytical technique where gas phase mixtures are separated into their individual components and subsequently identified. The technique may be employed to obtain both qualitative and quantitative information about the components of the mixture. Specifically, the separation mechanism employs two different media, one moving (mobile phase) and one unmoving (stationary phase). In GC, the mobile phase is typically hydrogen or helium, which flows across the stationary phase, which is a solid or otherwise immobilized liquid on a solid support. The solid support is typically disposed in a capillary column, through which the mobile phase and gas phase mixtures are passed.

GC instrumentation generally include an oven cavity, having a front door, a heat source, and a heat distributor (fan). The sample analysis train includes (sequentially), a sample inlet, for introducing sample into the GC analytical pathway, a connector fluidically attaching the sample inlet to the head of the guard column, a guard column having an inlet and an outlet, a connector fluidically attaching the outlet of the guard column to the head of the analytical column, an analytical column having an inlet and an outlet, a connector fluidically attaching the outlet of the analytical column to the detector, and a detector. In many commercial GC instruments, the oven cavity is designed to house two complete sample trains in parallel.

GC Analytical Columns

Manufacturing practices for GC capillary columns are well known in the art. Commercial analytical columns typically employ a narrow diameter capillary, composed of borosilicate glass, polyimide-coated fused silica, or stainless-steel. The inner surface of the analytical column is chemically treated with stationary phase that enables separation of the volatized sample.

Analytical capillary column lengths typically range from 5 to 100 meters, depending on the analytical application. Column diameters may range from about 0.4 mm to about 0.7 mm. Given their long lengths, the columns are coiled to enable easy handling and installation into the oven cavity. Column coil diameters for standard forced air GC ovens generally range from 15 cm to 20 cm.

The column coil is often mounted on a cage or solid mount, with the cage design having as little thermal mass as possible. Wire cages are often employed. In addition to little thermal mass, the cage or mount design is preferably arranged so as to minimize thermal shadows or the blocking of the forced heated air from part of the column length.

The column coil is positioned in the oven with the center axis of the coil along the center axis of the heater assembly. This arrangement ensures equidistance between the capillary coil and the heater assembly and minimizes any blockage of the air flow which might create cold spots or thermal shadows across the length of the column.

The analytical column is connected directly to the inlet of the GC (sample introduction end, head of the column) and attached to the outlet of the GC (exhaust end, detector end) creating a fluidic conduit for the sample analysis from the GC inlet, through the column to the detector. In order to achieve fluidic connection to the GC instrument, a short length of the column (about 0.5 m) is uncoiled off both ends of the column cage to reach the GC inlet and the detector, respectively.

GC Oven Cavity

In conventional GC instrumentation, laboratory benchtop GC ovens are essentially an open cavity with the heater assembly located near one of the interior walls. Within the oven cavity, the area with the most stable and accurate temperature is the cavity center. Because the heat source is localized against one inner surface of the oven cavity, a fan is used to mix the air and create a more homogeneous temperature distribution throughout the oven cavity. Standard GC oven cavities are approximately 30 cm L×30 cm H×20 cm D.

Temperature plays an important role in the successful separation of the analytes. The analytical column is maintained in a temperature-controlled environment. In many cases, the temperature is increased, or ramped, as part of the analysis protocol. Stable and accurate temperatures are critical to consistent and reproducible chromatograms. However, maintaining stable and accurate temperature is more challenging for GC analyses employing a temperature ramp. Isothermal runs are less affected by temperature disparities, but the effect is still observed. The vast majority of GC analyses are performed with a temperature ramp.

Despite the high air turbulence in the oven cavity, there remain thermal pockets (regions of the cavity interior where the temperature is not equivalent to the target temperature). These areas may be higher temperature (hot spots) or lower temperature (cold spots), and often may be located in areas of lower air turbulence, such as in the oven corners, or in close proximity to the oven walls. In order to reduce any contribution from hot or cold spots, the analytical column is generally positioned in the center of the oven cavity, directly in front of the heater+fan assembly, preferably where the center point of the coil is along the center axis of the heat distributor.

The further away from the center position of the oven, the greater the potential temperature disparity between the target and the actual temperature. It is generally regarded in the art to avoid positioning the analytical column coil remotely from the cavity center. The optimal position in the oven cavity is where the coil is essentially equidistant to the heater source in order to prevent one portion of the coil from obscuring another portion of the coil from the heat source ('thermal shadow'). Column designs that create or enhance potential thermal shadow effects are also avoided.

Guard Columns

In many applications, an additional 1 to 5-meter length of sacrificial column is employed between the GC inlet connections and the inlet of the analytical column. This sacrificial column acts as a guard that is employed to trap involatile or very high boiling point contaminants that accumulate to degrade column performance over time, thus extending the usable lifetime of the analytical column. Guard columns are also employed to focus the desired analytes onto the head of the analytical column.

In order to reduce any potential contribution of the guard column to the separation, guard columns commonly have no stationary phase or lesser amounts of stationary phase as compared to the analytical column. This enables the analytes of interest to pass through the guard column length and subsequently accumulate on the head of the analytical column for separation.

Because there is little to no retention of the analyte in the guard column, the temperature constraints of the oven position are less stringent.

Known guard columns are most commonly arranged in a coil whose diameter is consistent with the coil diameter of the analytical column. This allows the guard column to reside on the same cage assembly as the analytical column, stacked against the analytical column in the same center position in the oven. While there is some convenience received after the columns are installed, the operator effort to install both columns is considerable. The installation process is complicated due to the 'loose' nature of two flexible capillary coils joined by a column connector, which is unanchored to any stable surface.

Guard Column Coil Aspect Ratio

Because of the coil diameter and the comparatively short column lengths, commercial guard column consists of only a few coils. Commercial guard columns therefore have very high aspect ratios, where the aspect ratio of a column coil is calculated as:

$$\text{Coulmn coil aspect ratio } (AR) = \frac{\text{column coil diameter (mm)}}{\text{column coil width (mm)}}$$

By way of example, a 1-meter guard column, having a coil diameter of 170 mm and column diameter of 0.4 mm, yields about 2 coils. This results in a coil aspect ratio of about 213. In another example, a 5-meter guard column, having a coil diameter of 170 mm and column diameter of 0.7 mm, yields about 9 coils. This results in a coil aspect ratio of about 27.

TABLE 1

Calculated aspect ratios for guard columns having an equivalent diameter as the analytical column.

|  | 170 mm coil diameter; 0.4 mm column diameter | 170 mm coil diameter; 0.7 mm column diameter |
| --- | --- | --- |
| 1,000 mm column length | ~2 coils; 0.8 mm coil width; AR = 213 | ~2 coils; 1.4 mm coil width; AR = 121 |
| 5,000 mm column length | 9 coils; 3.6 mm coil width; AR = 47 | 9 coils; 6.3 mm coil width AR = 27 |

Common aspect ratios for guard columns having an equivalent diameter as the analytical column typically range from about 20 to about 250.

BRIEF DESCRIPTION OF THE INVENTION

In one exemplary embodiment, a gas chromatography guard column assembly includes a guard column having a guard column inlet and a guard column outlet. The guard column is disposed in a coil having a column coil aspect ratio of less than 15.

In another exemplary embodiment, a gas chromatography system includes an oven cavity, a heater assembly localized to an internal surface of the oven cavity, an inlet, a guard column in fluid communication with the inlet and downstream of the inlet, an analytical column in fluid communication the guard column and downstream of the guard column, and a detector in fluid communication with the analytical column and downstream of the analytical column. The guard column is disposed in a guard column coil and the analytical column is disposed in an analytical column coil. The analytical column coil has an analytical column coil central axis aligned with a central axis of the heater assembly, and the guard column coil has a guard column coil central axis remote from the central axis of the heater assembly.

BRIEF DESCRIPTION OF THE DRAWINGS

FIG. 7 depicts a butterfly plot of two chromatograms comparing the GC analysis of a chemical standard consisting of $C_8$ to $C_{40}$ hydrocarbons comparing known GC system and a GC system according to an embodiment of the present disclosure.

Wherever possible, the same reference numbers will be used throughout the drawings to represent the same parts.

DETAILED DESCRIPTION OF THE INVENTION

A guard column assembly having a reduced coil diameter and coil aspect ratio is disclosed, which may be aligned with the GC sample inlet rather than the heater assembly.

As used herein, "about" indicates a variance of ±15% of the value being modified by "about," unless otherwise indicated to the contrary.

Figure 1:
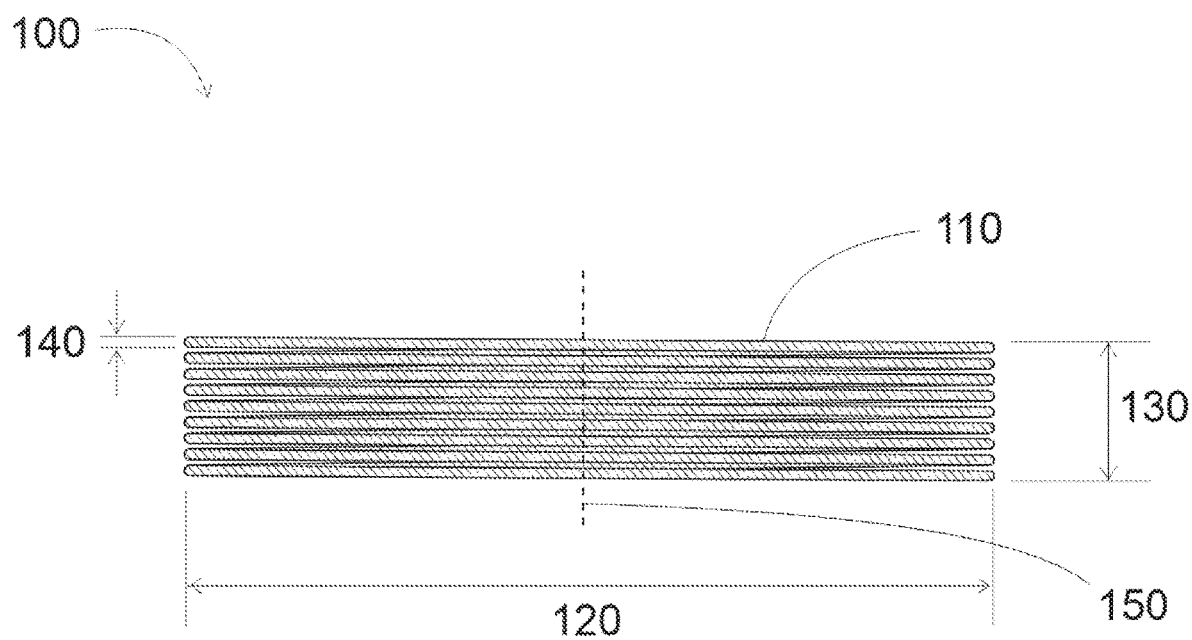
FIG. 1 illustrates a coil shape for a GC column, known in the art.

Referring to FIG. 1, the basic coil shape of an GC analytical column 100 is well-known. GC analytical columns typically range from about 5 m to about 100 m in length, although other lengths are sometimes used. The structure of a GC analytical column 100 is typically a capillary tube having a lumen therethrough. The internal diameter of the capillary tube may range from about 0.1 mm to about 0.6 mm, which promotes separation of a gas sample being passed therethrough. Typical capillary outer diameter 140 values range from about 0.4 mm to about 0.7 mm, resulting in a long, flexible column. For convenience and compatibility with GC instruments, the analytical column 100 is wound into an analytical column coil 110. The individual coils of the analytical column coil 110 are stacked one on top of another resulting in a bulk coil diameter 120, having an analytical column coil width 130 and an analytical column coil central axis 150.

Figure 2:
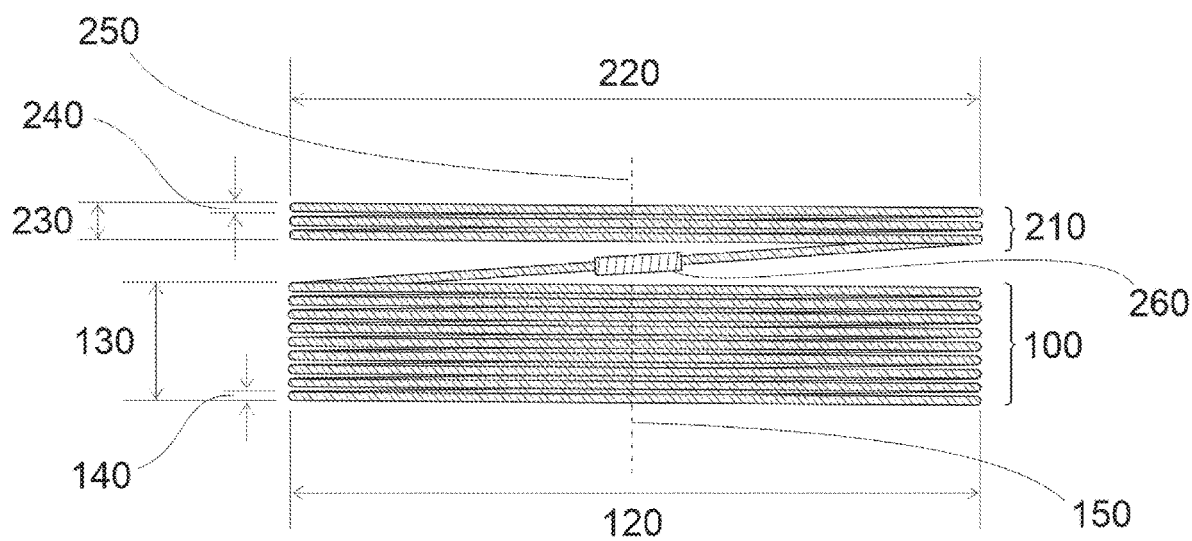
FIG. 2 illustrates a commercial GC coil assemble, known in the art.

Referring to FIG. 2, a typical commercial GC coil assembly 200 include an analytical column coil 100 fluidically connected to a guard column coil 210. The guard column coil diameter 220 generally has the same dimensions as the analytical column coil diameter 120. The guard column capillary diameter 240 is on the same scale as the analytical coil diameter 140 and the guard column coil central axis 210 is aligned to the analytical coil central axis 150.

A column connector 260 fluidically connects the guard column 210 and the analytical column 100. Many commercial connectors are available which are suitable for connecting the guard column 210 to the analytical column 100. Exemplary examples include the press-tight universal column connectors (e.g., Restek part #20400; Universal Press-Tight Connector), which is a single piece connector employing a friction fit to create a gastight seal between the columns. Another standard connector design employs compression ferrules to surround the end of each capillary column. Examples include the stainless steel Valco Zero Dead Volume Internal Union (Restek part #20147) and the comparatively smaller, lower mass SGE SilTite μ-Union Connectors (Restek part #23882).

Figure 3:
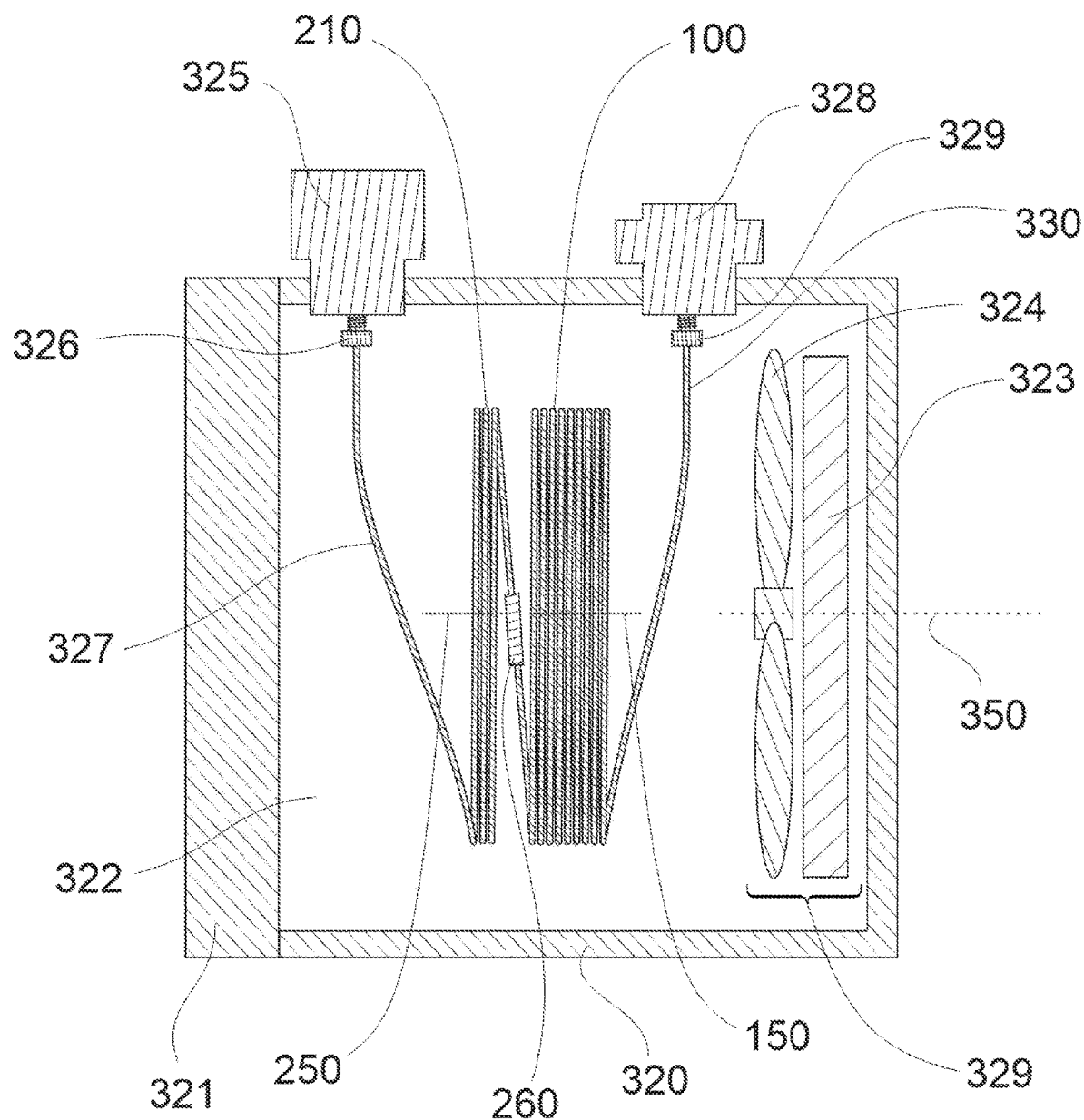
FIG. 3 illustrates a cutaway side view of a GC instrument oven containing a GC coil assemble, known in the art.

Referring to FIG. 3, a cut away view shows a typical commercial GC instrument oven containing GC coil assembly 200. The GC instrument comprises a GC oven wall 320 and GC oven front door 321 which enclose the GC oven cavity 322. On one wall of the oven cavity 322 resides an oven heater 323 and oven heater fan 324, which control temperature in the oven interior 322. To ensure an accurate temperature environment for the analytical column 100, the central axis 250 of the column assembly 200 is aligned to the heater assembly central axis 350 comprising the oven heater 323 and oven heater fan 324.

In the GC instrument, the sample path begins with sample introduction at the sample inlet 325. Several sample inlet designs are well known to the art. The sample train continues through the guard column 210, on through the analytical column 100 where the sample is separated into its constituent components. Past the analytical column 100 the separated components are measured at the GC detector 328. Several GC detector designs are also well known to the art.

In order to achieve a leak free sample train within the spatial constraints of the GC layout, a short length of column 327 is uncoiled from guard column 210 and fluidically sealed to the GC inlet 325 using an inlet connector 326. Another short length of column 330 is uncoiled from analytical column 210 and fluidically sealed to the GC detector 328 using an outlet connector 326.

Connection 326 between the inlet and the inlet of the guard column 210 may be similar in function to the compression ferrule designs described previously for the column connector 260. Depending on the design of the connectors employed in the sample train, the sample may also interact with a portion of the connector interior walls as well.

Figure 4:
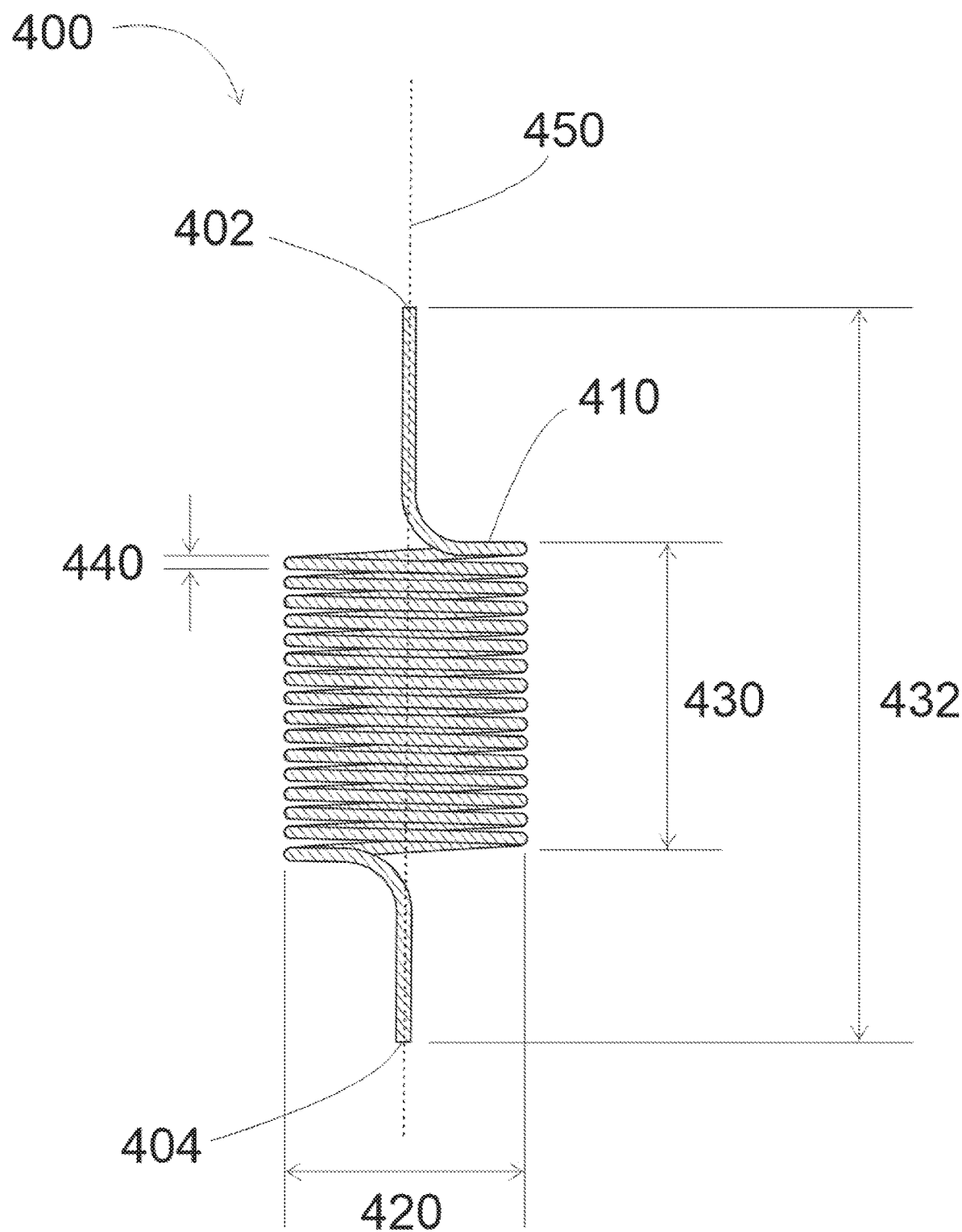
FIG. 4 illustrates a GC guard column, according to an embodiment of the present disclosure.
Figure 5A:
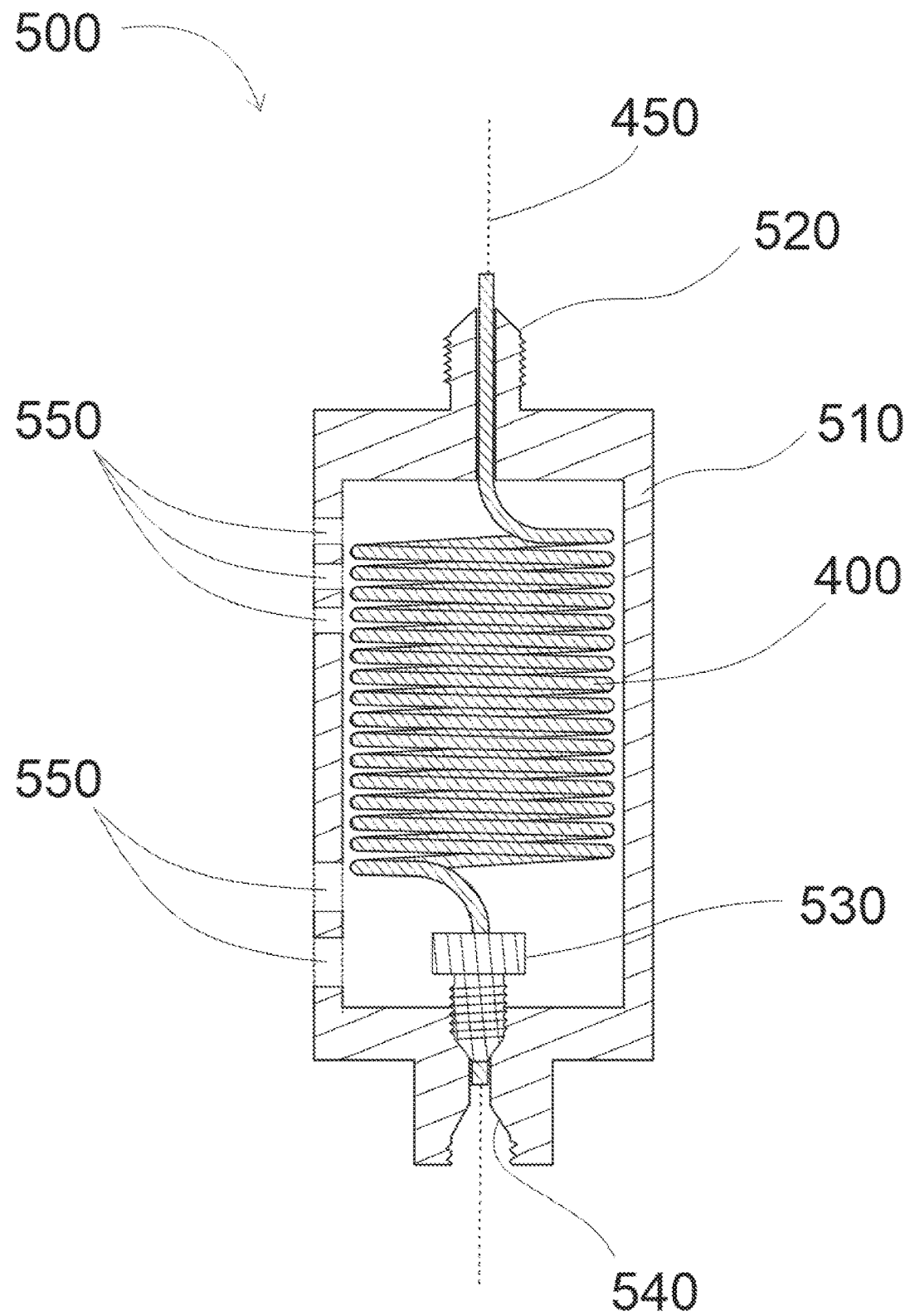
FIG. 5(a) illustrates a GC guard column assembly with the guard column disposed inside a cartridge, according to an embodiment of the present disclosure.
Figure 5B:
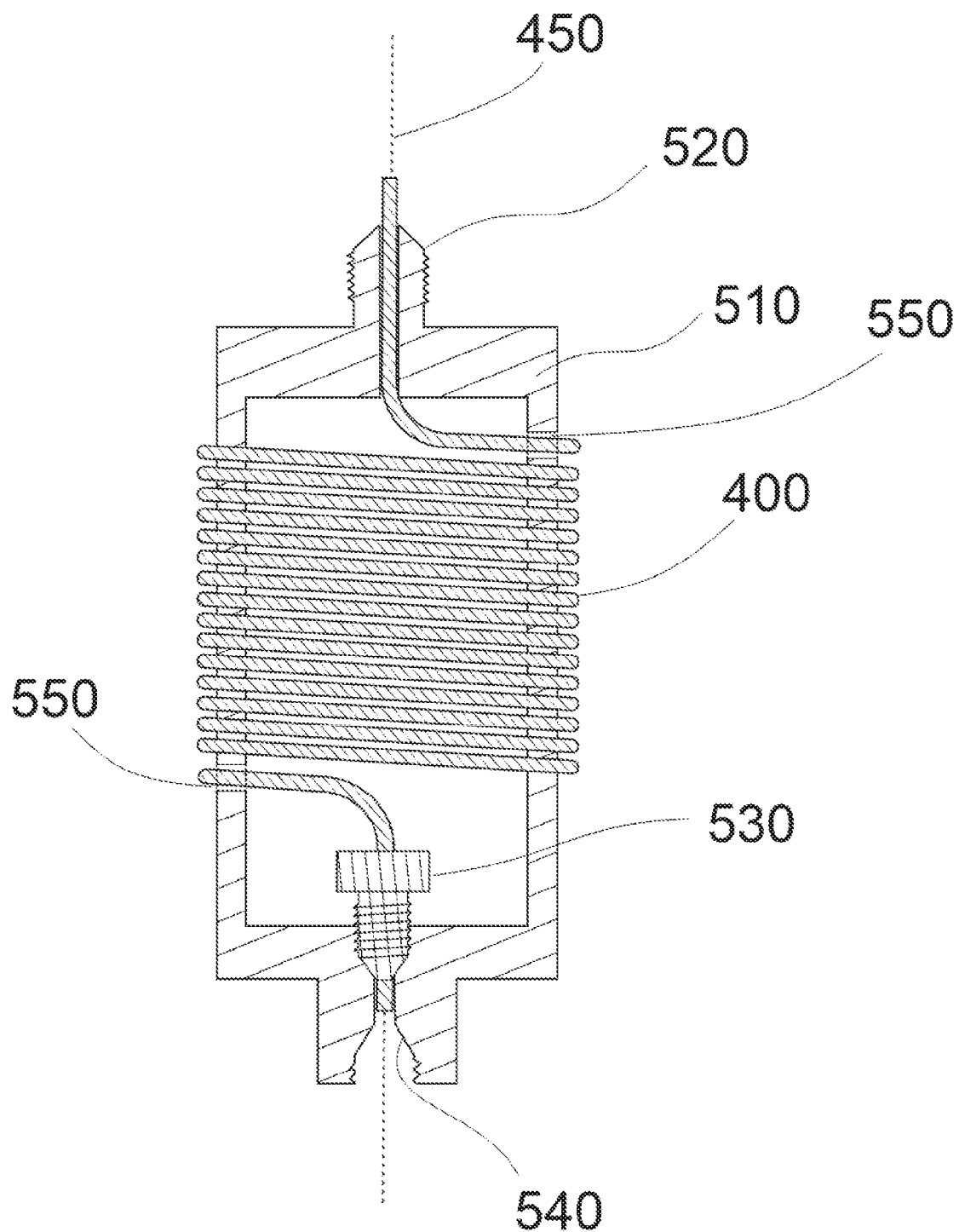
FIG. 5(b) illustrates a GC guard column assembly with the guard column disposed around a cartridge, according to an embodiment of the present disclosure.

Referring to FIGS. 4, 5(a), and 5(b), in one embodiment, a gas chromatography guard column assembly 500 includes a guard column 400 having a guard column inlet 402 and a guard column outlet 404. The guard column 400 is disposed in a guard column coil 410 having a column coil aspect ratio of less than 15. The guard column coil 410 may have any suitable column coil aspect ratio, including, but not limited to a column coil aspect ratio between 0.1 to 14.9, alternatively from 0.1 to 1, alternatively from 0.5 to 1.5, alternatively from 1 to 2, alternatively from 1.5 to 2.5, alternatively from 2 to 3, alternatively from 2.5 to 3.5, alternatively from 3 to 4, alternatively from 3.5 to 4.5, alternatively from 4 to 5, alternatively from 4.5 to 5.5, alternatively from 5 to 6, alternatively from 5.5 to 6.5, alternatively from 6 to 7, alternatively from 6.5 to 7.5, alternatively from 7 to 8, alternatively from 7.5 to 8.5, alternatively from 8 to 9, alternatively from 8.5 to 9.5, alternatively from 9 to 10, alternatively from 9.5 to 10.5, alternatively from 10 to 11, alternatively from 10.5 to 11.5, alternatively from 11 to 12, alternatively from 11.5 to 12.5, alternatively from 12 to 13, alternatively from 12.5 to 13.5, alternatively from 13 to 14, alternatively from 13.5 to 14.5, alternatively from 14 to 15, or any combination or sub-range thereof.

In one embodiment, the guard column coil diameter 420 is narrower than the standard commercial guard column 210. Commercial guard columns coil diameters 220 generally range from 15 cm to 20 cm, which is consistent with mounting the guard column to the analytical column 100 and aligned to the oven heater central axis. The dimensions of the guard column coil 410 may be constrained to be consistent with alignment of the guard column coil diameter 420 with the inlet 324 or any other suitable position within the GC oven cavity 322 which is remote from the oven heater central axis 350.

The guard column 400 has a column diameter 440 and may have any suitable column length, including, but not limited to, a column length from 0.75 m to 6 m, alternatively from 1 m to 5 m, or any combination or sub-range thereof.

The guard column coil 410 may have any suitable width, including, but not limited to, a guard column coil width 430 from 1 mm to 40 mm, alternatively from 1 mm to 10 mm, alternatively from 1 mm to 3 mm, alternatively from 2 mm to 4 mm, alternatively from 3 mm to 5 mm, alternatively from 4 mm to 6 mm, alternatively from 5 mm to 7 mm, alternatively from 6 mm to 8 mm, alternatively from 7 mm to 9 mm, alternatively from 8 mm to 10 mm, or any combination or sub-range thereof. The guard column coil width 430 refers to the width of only the coiled portion 410 of the guard column 400 rather than the entire width 432 of the guard column 400 inclusive of both the coiled portion of the guard column 400 as well as uncoiled portions of the guard column 400 extending from the guard column coil 410 to the guard column inlet 402 and the guard column outlet 404.

The guard column coil 410 may have any suitable diameter, including, but not limited to, guard column coil diameter 420 from 10 mm to 55 mm, alternatively from 15 mm to 50 mm, alternatively from 15 mm to 25 mm, alternatively from 20 mm to 30 mm, alternatively from 25 mm to 35 mm, alternatively from 30 mm to 40 mm, alternatively from 35 mm to 45 mm, alternatively from 40 mm to 50 mm, or any combination or sub-range thereof.

TABLE 2

Calculated aspect ratios for guard column coils 410 having a diameter compatible with the GC sample inlet assembly 325.

|  | 20 mm coil diameter; 0.4 mm column diameter | 20 mm coil diameter; 0.7 mm column diameter | 40 mm coil diameter; 0.4 mm column diameter | 40 mm coil diameter; 0.7 mm column diameter |
|---|---|---|---|---|
| 1,000 mm column length | 16 coils; 6.4 mm coil width; AR = 3.1 | 16 coils; 11 mm coil width; AR = 1.8 | 8 coils; 3.2 mm coil width; AR = 12.5 | 8 coils; 5.6 mm coil width; AR = 7.1 |
| 5,000 mm column length | 80 coils; 32 mm coil width; AR = 0.63 | 80 coils; 56 mm coil width AR = 0.36 | 40 coils; 16 mm coil width; AR = 2.5 | 40 coils; 28 mm coil width; AR = 1.4 |

The guard column coil 410 may be made from any suitable material, including, but not limited to, glass, fused silica, stainless steel, or combinations thereof.

Referring to FIGS. 5(a) and 5(b), in one embodiment, the gas chromatography guard column assembly 500 including a cartridge 510 configured to support the guard column 400. The guard column 400 may be disposed within the cartridge 510 (FIG. 5(a)) or coiled around the cartridge 510 (FIG. 5(b)). The cartridge 510 may include a plurality of apertures 550 disposed in a wall thereof to define a cage structure (FIG. 5(a)).

The cartridge 510 may include integrated connection hardware for fluidically sealing both ends of the guard column 400 into the sample analysis path. The cartridge 510 with integrated connectors may enable single-hand installation of the guard column assembly 500 into the GC instrument. In such an embodiment, neither end of the guard column 400 is handled loose, which reduces complexity during installation, unlike current known commercial configurations which require two hands to install a guard column 210 into an inlet 325 and two hands to connect an analytical column 100 to a guard column 210. Further, when the guard column assembly 500 includes integrated hardware to connect the guard column 400 directly to the inlet 325, no additional tools commonly associated with guard column 210 installation may be required during installation, and due to the cylindrical nature of the cartridge 510, adequate torque may be provided manually for installing the guard column 400.

In one embodiment, the cartridge 510 may be configured to enhance heat transfer from the heater assembly 329 and the guard column 400. The cartridge 510 may have a material composition with high thermal conductivity, such as, but not limited to, a metal, a thermally conductive ceramic, or combinations thereof. The cartridge 510 may include thin walls, apertures 550, or slots in order to enhance direct air flow from the heater assembly 329 to the interior of the cartridge 510. The cartridge 510 may also have surface features such as, but not limited to, protrusions, fins, threads, dimples, or other shapes which facilitate radiant heat transfer to the guard column 400. In another embodiment, the cartridge 510 has a wire cage or other open mesh design which enhances consistency between the oven temperature and guard column temperature. In one embodiment, wherein the guard column coil 410 is wrapped on the exterior of the cartridge 510, access of the guard column 400 to the GC oven air is maximized, which may enhance heat transfer.

In one embodiment, the guard column 400 is configured to be maintained at a consistently lower temperature than the oven cavity 322. The cartridge may have a material composition with low thermal conductivity, such as, but not limited to, glass, thermal insulating ceramic, or combinations thereof. The cartridge 510 may have few or no features that fluidly communicate the interior of the cartridge 510 with the oven cavity 322.

The gas chromatography guard column assembly 500 may include an inlet adapter 520 configured to engage a gas chromatograph inlet 325, the guard column inlet 402 being disposed within and passing through the inlet adapter 520.

Figure 6:
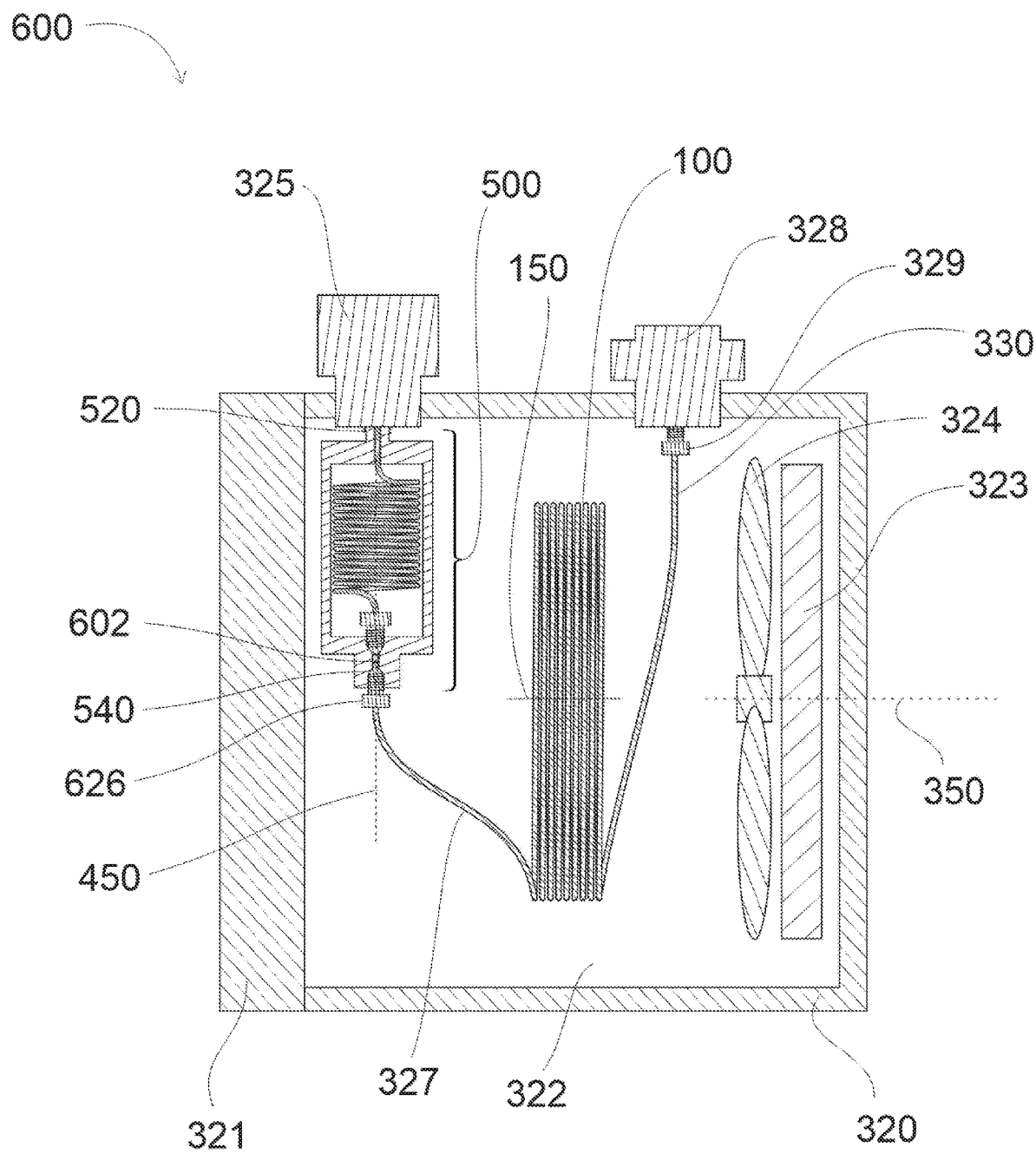
FIG. 6, illustrates a GC system having a GC guard column assembly, according to an embodiment of the present disclosure.

Referring to FIG. 6, the gas chromatography guard column assembly 500 may include an outlet adapter 540 in which the guard column outlet 404 is disposed and to which the guard column outlet 404 is engaged, the outlet adapter 540 being configured to further engage an analytical column inlet 602 such that when the analytical column inlet 602 is engaged, by way of example with a connecter 626, the guard column 400 is in fluid communication with the analytical column 100. In one embodiment, a union-style connector 530 seals the guard column outlet 404 to the cartridge 510, and the outlet adapter 540 receives a connector sealing the inlet of the analytical column 100 to the cartridge 510. Either sealing design may be employed at either end of the guard column assembly 500, depending on the configuration of inlet 325 employed and the type of connection employed between the guard column assembly 500 and the analytical column 100.

In one embodiment, a gas chromatography system 600 includes an oven cavity 322, a heater assembly 329 localized to an internal surface of the oven cavity 322, an inlet 325, a guard column 400 in fluid communication with the inlet 325 and downstream of the inlet 325, an analytical column 100 in fluid communication the guard column 400 and downstream of the guard column 400, and a detector 328 in fluid communication with the analytical column 100 and downstream of the analytical column 100. The guard column 400 is disposed in a guard column coil 410, and the analytical column 100 is disposed in an analytical column coil 110. The analytical column coil 410 has an analytical column coil central axis 150 aligned with a heater assembly central axis 350, and the guard column coil 400 has a guard column coil central axis 450 remote from the heater assembly central axis 350.

In one embodiment, the cartridge 510 directly attaches to the inlet 325. In a further embodiment, the guard column coil 410 is disposed directly below the inlet 325 and the extends away from the inlet 325. The total volume of the oven cavity 322 holds at least one sample train, where the inlet 325 and detector assemblies 328 must have through-access to the oven exterior. In order to ensure sufficient space for the column assembly (or assemblies, if the instrument is equipped with two parallel sample trains) the sample inlet 325 is typically disposed in regions close to the oven walls, positioned in corners of the oven which limits manual access to the portion of the inlet 325 resident inside the oven. Due to this constrained position, guard columns 400 designed to interface directly beneath the sample inlet 325 should be radially narrow to enable clearance for installation. If connections involve threaded fittings, for example, the entire guard column assembly 500 should be narrow enough to allow free rotation while engaged with the inlet. Preferably, an operator will install the guard column assembly 500 using only their hand. This in turn requires clearance for the operator's hand as well as clearance for the guard column assembly 500.

In one embodiment, the guard column coil central axis 450 is oriented at an angle of at least 30° with respect to the heater assembly central axis 350. In a further embodiment, the guard column coil central axis 450 is orthogonal to the heater assembly central axis 350.

The guard column coil 410 may be disposed in a portion of the oven cavity 322 having an average temperature deviating from a region in which the analytical column coil 110 is disposed by at least 5° C., alternatively at least 10° C., alternatively at least 15° C. The deviation may be a higher temperature or a lower temperature.

In one embodiment, a plurality of guard columns 400 are disposed in a cartridge 510, connected in sequence. In a further embodiment, the plurality of guard columns 400 disposed in the cartridge 510 have distinct phase compositions.

In another embodiment, a plurality of cartridges 510 are connected in sequence, each of the plurality of cartridges 510 including at least one guard column 400. The plurality of cartridges 510 may include guard columns 400 having the same phase composition or distinct phase compositions.

EXAMPLES

In a first control experiment, GC analysis was performed on $C_8$ to $C_{40}$ hydrocarbon standard (Restek Florida TRPH Standard; catalog #31266) using the experimental setup illustrated in FIG. 3.

In a second experiment, the same guard column 400 and analytical column 100 were used. In order to re-coil and reposition the guard column 400, the two columns had to be separated at the point of connection. To reduce the amount of disturbance to the analytical system, the connections between the sample inlet 325 and the guard column 400, and the analytical column 100 and the detector 328, were maintained. To reconnect the columns, a 2 cm length of column was trimmed off the guard column 400 and the analytical column 100 each.

The guard column 400 was coiled to a coil diameter 420 of 28 mm and housed in a perforated stainless-steel tube 510 similar to the guard column 500 assembly illustrated in FIG. 5 and reinstalled in the instrument in alignment with the GC inlet 325, as illustrated in FIG. 6. The analytical column 100 was then connected to the guard column outlet 404. The same run conditions were applied as the first experiment.

GC Instrument Run Conditions
Sample: $C_8$-$C_{40}$ hydrocarbon standard (Restek Florida TRPH Standard; catalog #31266).
Analytical Column: Rxi 5Sil MS column—15 m×0.25 mm ID×1.0 μm film thickness (thin film, catalog #13605)
Guard Column: 5 m IP Deactivated Guard Column (Restek #10043)
Inlet temp.: 280° C., FID detector
Inlet mode: Split mode, split ratio 50:1
Carrier gas: Hydrogen Constant flow mode at 1 mL/min
Oven ramp: 40° C., hold for 1 minute, ramp to 330° C. at 25°/min, hold for 10 minutes Referring to FIG. 7, a butterfly plot of the two chromatograms comparing the GC analysis of a chemical standard consisting of $C_8$ to $C_{40}$ hydrocarbons (top trace: data obtained from an experimental setup using a standard analytical column 100 and a standard guard column 210, positioned as illustrated in FIG. 3; bottom trace: data obtained from standard analytical column using the same standard analytical column 100 and the same standard guard column 400 reconfigured into a guard column coil 410, positioned as illustrated in FIG. 6) is presented.

The data is very similar, indicating performance equivalence. The last peak to elute ($C_{40}$) is 3.1 seconds faster in the second experiment. The elution difference is consistent with the columns having been trimmed between the runs. There is no evidence of a thermal shadow effect. The data supports that the guard column 400 in the configuration depicted in FIG. 6, positioned off axis from the heater central axis 350, is consistent to the standard commercial variety of guard columns 210.

While the foregoing specification illustrates and describes exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A gas chromatography guard column assembly, comprising:
a guard column having a guard column inlet and a guard column outlet,
wherein the guard column is disposed in a guard column coil having a column coil aspect ratio of less than 15, the column coil aspect ratio being a diameter of the guard column coil divided by a width of the guard column coil.

2. The gas chromatography guard column assembly of claim 1, further including a cartridge configured to support the guard column.

3. The gas chromatography guard column assembly of claim 2, wherein the guard column is disposed within the cartridge.

4. The gas chromatography guard column assembly of claim 2, wherein the guard column is coiled around the cartridge.

5. The gas chromatography guard column assembly of claim 2, wherein the cartridge includes a cartridge wall having a plurality of apertures adjacent to the guard column, the plurality of apertures defining a cage structure.

6. The gas chromatography guard column assembly of claim 2, further including an inlet adapter configured to engage a gas chromatograph inlet, the guard column inlet being disposed within and passing through the inlet adapter.

7. The gas chromatography guard column assembly of claim 2, further including an outlet adapter in which the guard column outlet is disposed and to which the guard column outlet is engaged, the outlet adapter being configured to further engage an analytical column inlet such that when the analytical column inlet is engaged, the guard column is in fluid communication with the analytical column.

8. The gas chromatography guard column assembly of claim 1, wherein the guard column has a column length from 0.75 m to 6 m.

9. The gas chromatography guard column assembly of claim 1, wherein the guard column coil has a length from 1 mm to 10 mm.

10. The gas chromatography guard column assembly of claim 1, wherein the guard column coil has a diameter from 10 mm to 55 mm.

11. A gas chromatography system, comprising:
- an oven cavity;
- a heater assembly localized to an internal surface of the oven cavity;
- an inlet;
- a guard column in fluid communication with the inlet and downstream of the inlet, the guard column being disposed in a guard column coil and having a column coil aspect ratio of less than 15, the column coil aspect ratio being a diameter of the guard column coil divided by a width of the guard column coil;
- an analytical column in fluid communication the guard column and downstream of the guard column, the analytical column being disposed in an analytical column coil; and
- a detector in fluid communication with the analytical column and downstream of the analytical column, wherein the analytical column coil has an analytical column coil central axis aligned with a heater assembly central axis, and the guard column coil has a guard column coil central axis remote from the heater assembly central axis.

12. The gas chromatography system of claim 11, further including a cartridge configured to support the guard column.

13. The gas chromatography system of claim 12, wherein the guard column is disposed within the cartridge.

14. The gas chromatography system of claim 12, wherein the guard column is coiled around the cartridge.

15. The gas chromatography system of claim 12, wherein the cartridge directly attaches to the inlet.

16. The gas chromatography system of claim 15, wherein the guard column coil is disposed directly below the inlet and extends away from the inlet.

17. The gas chromatography system of claim 11, wherein the guard column coil central axis is oriented at an angle of at least 30° with respect to the heater assembly central axis.

18. The gas chromatography system of claim 17, wherein the guard column coil central axis is orthogonal to the heater assembly central axis.

19. The gas chromatography system of claim 11, wherein the guard column coil is disposed in a portion of the oven cavity having an average temperature deviating from a region in which the analytical column coil is disposed by at least 5° C.

* * * * *